United States Patent [19]

Flygare et al.

[11] Patent Number: 4,882,513

[45] Date of Patent: Nov. 21, 1989

[54] DUAL PERMANENT MAGNET GENERATOR

[75] Inventors: Wayne A. Flygare; Raymond N. Olson; Richard W. Reynolds, all of Rockford; Mohd A. Aleem, Roscoe, all of Ill.

[73] Assignee: Sundstrand Corporation, Rockford, Ill.

[21] Appl. No.: 812,840

[22] Filed: Dec. 23, 1985

[51] Int. Cl.⁴ .................. H02K 1/28; H02K 7/116
[52] U.S. Cl. ..................... 310/114; 310/121
[58] Field of Search .............. 310/112, 114, 116, 118, 310/122, 154; 322/32

[56] References Cited

U.S. PATENT DOCUMENTS

| | | |
|---|---|---|
| 1,070,437 | 8/1913 | Ferguson . |
| 1,104,793 | 7/1914 | Grillet et al. . |
| 2,740,909 | 3/1956 | Chapman ............... 310/102 |
| 3,233,133 | 2/1966 | Kober .................... 310/191 |
| 3,405,296 | 10/1968 | Stilley et al. ............ 310/116 |
| 3,713,015 | 1/1973 | Frister ..................... 322/28 |
| 4,031,421 | 6/1977 | Geiger .................... 310/114 |
| 4,110,649 | 8/1978 | Mas ........................ 310/154 |
| 4,229,689 | 10/1980 | Nicholadze ............ 310/112 |
| 4,305,031 | 12/1981 | Wharton ................. 310/114 |

FOREIGN PATENT DOCUMENTS

| | | |
|---|---|---|
| 0058025 | 8/1982 | European Pat. Off. . |
| 839061 | 5/1952 | Fed. Rep. of Germany . |
| 3317553 | 11/1984 | Fed. Rep. of Germany . |
| 2191329 | 2/1974 | France . |
| 443472 | 2/1968 | Switzerland . |

Primary Examiner—Peter S. Wong
Assistant Examiner—D. L. Rebsch
Attorney, Agent, or Firm—Wood, Dalton, Phillips, Mason & Rowe

[57] ABSTRACT

The effects of operational loading on a permanent magnet generator of the type having first and second permanent magnet assemblies 28, 30 mounted on a shaft 26, and movable relative to each other is eliminated by rotatably mounting each of the assemblies 28, 30 for rotation relative to the shaft 26, as well as to each other, and connecting them to the shaft by equal, but oppositely pitched helical spline connections 50, 52, 58, 60. Axial movement of the shaft 26 will then cause equal, but opposite relative movement of the permanent magnet assemblies 28, 30, so that the forces resisting movement of one such assembly act to encourage movement of the other, thereby balancing out said forces.

4 Claims, 1 Drawing Sheet

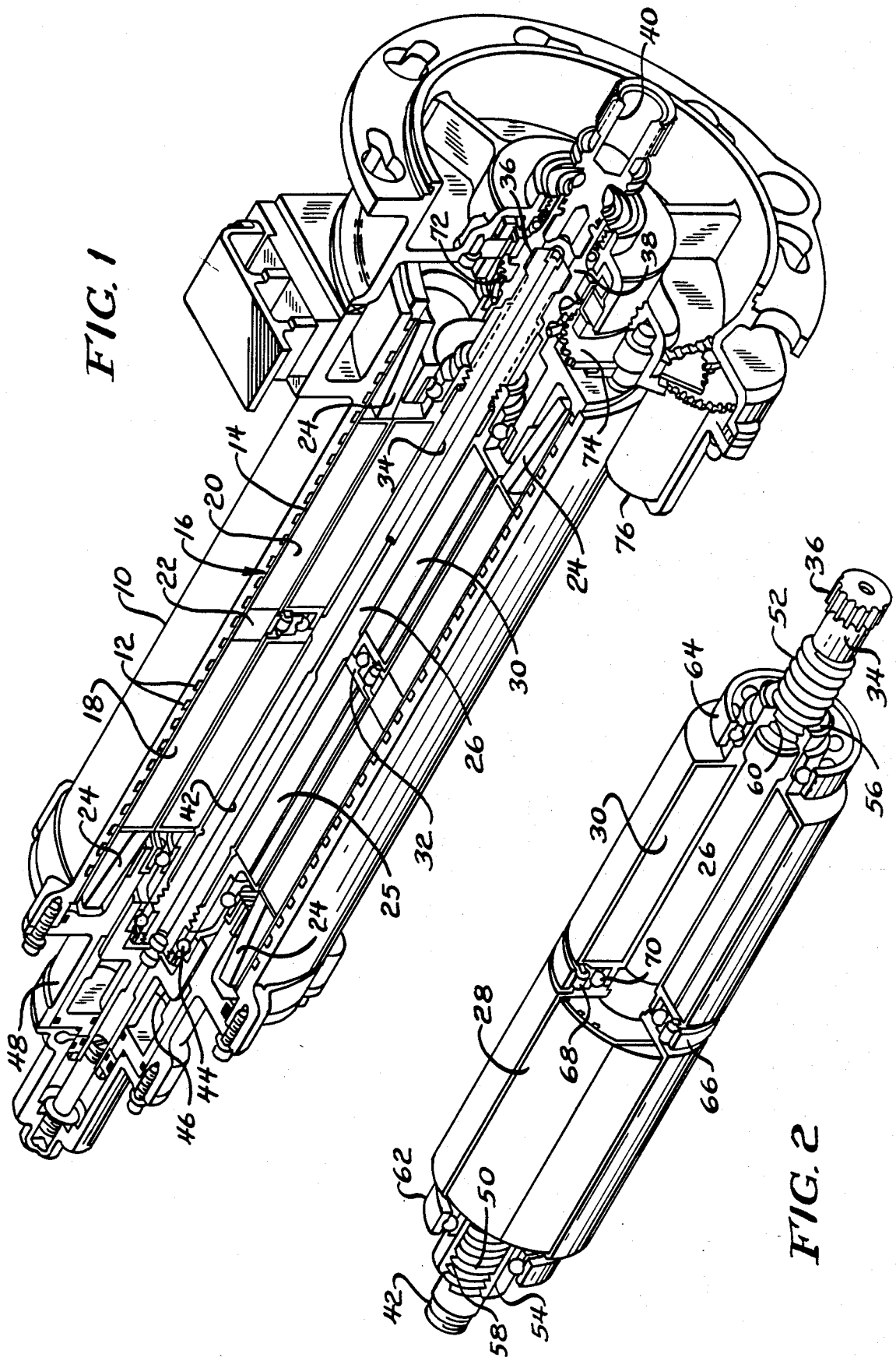

DUAL PERMANENT MAGNET GENERATOR

FIELD OF THE INVENTION

This invention relates to a permanent magnet generator, and more specifically, to a permanent magnet generator having two, relatively movable, permanent magnet assemblies.

BACKGROUND OF THE INVENTION

Permanent magnet generators of the type having a rotor made up of two relatively movable permanent magnet assemblies have been proposed generally to provide for voltage regulation in response to changes in loading on the generator. They have also been employed for regulating voltage to compensate for changes in the rate of rotor rotation.

Examples of such proposals can be found in U.S. Pat. Nos. 3,233,133 issued Feb. 1, 1966 to Kober; 3,713,015 issued Jan. 23, 1973 to Frister; and 4,305,031 issued Dec. 8, 1981 to Wharton. Typical of these constructions is an arrangement wherein one of the permanent magnet assemblies is rigidly affixed to the rotor shaft and the other is rotatable relative thereto. By effecting relative rotation between the two permanent magnet assemblies, the output voltage of the generator may be varied, as described more fully in the previously identified patents, to achieve voltage regulation.

Though such systems should work well in theory, in practice, particularly in high speed generators, difficulty in effecting close regulation of the output voltage may be encountered. In particular, loading of the rotor components due to centrifugal force and other operational factors may render it difficult to achieve relatively precise angular adjustment of the movable permanent magnet assembly with respect to the fixed permanent magnet assembly. To the extent that precise adjustment is hindered, good control cannot be achieved.

The present invention is directed to overcoming the above problem.

SUMMARY OF THE INVENTION

It is the principal object of the invention to provide a new and improved generator of the type having a rotor including two relatively movable permanent magnet assemblies. More specifically, it is an object of the invention to provide such a generator wherein difficulties heretofore encountered in achieving accurate regulation through rotation of one magnet assembly relative to another are avoided.

An exemplary embodiment of the invention achieves the foregoing object in a generator construction including stator means having first and second adjacent armatures. First and second permanent magnet rotors are journalled for rotation within respective ones of the first and second armatures and there is provided a common drive for the rotors. Control means are provided for angularly shifting each of the rotors relative to the common drive angular distances in opposite directions.

As a result of this construction, loading forces existing by virtue of operation of the machine tending to resist movement of one of the rotors act oppositely on the other rotor and thus counteract each other, allowing relative rotor position to be easily adjusted with a minimum of energy expenditure.

In a preferred embodiment of the invention, the armatures and the rotors are coaxial.

In a highly preferred embodiment of the invention, the common drive comprises a shaft driving both of the rotors and the control means comprises first and second helical splines respectively interconnecting the first and second rotors to the shaft. The first and second helical splines have equal, but opposite, pitches.

The invention contemplates that the control means include means for moving the drive shaft along its axis between maximum and minimum alignment positions of the rotors, along with means for rotating the drive shaft about the axis for each of the axial positions.

In a highly preferred embodiment, a single set of windings is common to both of the armatures.

A highly preferred construction of the invention includes an elongated shaft having opposed ends. First and second helical splines are disposed on the shaft adjacent respective ends thereof and the splines have opposite pitches.

A thrust and journal bearing is provided intermediate the adjacent ends of the first and second permanent magnet assemblies so that the first permanent magnet assembly is to one side of the bearing and is connected to the first spline while the second permanent magnet assembly is to the other side of the bearing and is connected to the second spline. The stator includes an armature means coaxial with the shaft and has an axial extent encompassing the magnet assemblies. Means are provided for axially moving the shaft relative to the bearing and to the magnet assemblies to cause the magnet assemblies to simultaneously rotate in opposite directions on the shaft.

In a preferred embodiment, the moving means comprises a motor acting on the end of the shaft opposite an end to which a drive input is implied. The invention contemplates that the moving means comprise a control piston.

Other objects and advantages will become apparent from the following specification taken in connection with the accompanying drawings.

DESCRIPTION OF THE DRAWINGS

FIG. 1 is a perspective view of a permanent magnet generator made according to the invention with parts broken away for clarity; and FIG. 2 is an enlarged view similar to FIG. 1 but illustrating the rotor of the generator.

DESCRIPTION OF THE PREFERRED EMBODIMENT

An exemplary embodiment of a generator made according to the invention is illustrated in the drawings and with reference to FIG. 1 is seen to include an elongated, generally tubular housing 10 including a spiralled interior groove 12. A sleeve 14 is disposed radially inwardly of the groove 12 and serves to close the same so as to provide a conduit for so-called back-iron cooling.

Just radially inwardly of the sleeve 14 is a stator, generally designated 16, comprising first and second armatures 18 and 20. The armatures 18 and 20 are coaxial and slightly spaced by a support element 22.

A common set of windings, the end turns 24 of which can be seen, extends through both of the armatures 18 and 20.

An elongated shaft 26 extends longitudinally through the housing 10 along the axis thereof and rotatably drives first and second permanent magnet assemblies 28 and 30 respectively within the armatures 18 and 20. The permanent magnet assemblies 28 and 30 are rotatable relative to the shaft 26 and to each other and are coaxial, separated by a combination thrust and journal bearing 32 which supports the magnet assemblies 28 and 30 intermediate their ends and is mounted on the support element 22.

One end 34 of the shaft 26 includes axial splines 36 which are slidably received in a spline collar 38. The spline collar 38 is also connected to an input or drive shaft 40 which is coaxial with the end 34 of the shaft 26.

The opposite end 42 of the shaft 26 is coupled by a bearing 44 to an axially shiftable piston 46 received within a cylinder 48 at the corresponding end of the housing 10.

The piston 46 serves as a motor and by reason of its being coupled to the shaft 26 can cause axial movement of the shaft 26 along its rotational axis. Such axial movement of the shaft 26 without disconnecting the same from the drive input provided on the shaft 40 is accommodated by the connection of the axial splines 36 to the spline collar 38.

As perhaps best seen in FIG. 2, adjacent each of the ends 34 and 42 of the shaft 26 there is provided a helical spline. The first of the helical splines is designated 50 while the second is designated 52. The permanent magnet assemblies 28 and 30 respectively have hubs 54 and 56 provided with mating splines 58 and 60 engaged respectively with the splines 50 and 52. It will be observed from FIG. 2 that the first splines 50 at the end 42 are pitched oppositely of the second splines 52 at the end 34. In a preferred embodiment, while the pitch of the splines 50 and 52 is opposite, it is also equal.

The hubs 54 and 56 respectively mount bearings 62 and 64 for journalling the associated ends of the rotor defined by the shaft 26 and magnet assemblies 28 and 30.

The combination thrust and journal bearing 32 is also shown in greater detail in FIG. 2 and includes an outer race 66 which acts as a support bearing in connection with internal roller bearing elements 68. Ball bearing elements 70 radially inwardly of the roller bearing elements 68 act to provide for relatively frictionless relative movement between the permanent magnet assemblies 28 and 30.

Returning to FIG. 1, if desired, the shaft 26 may be provided with gear teeth 72 which may be coupled via an idler gear 74 to a hydraulic pump 76 or the like. The hydraulic pump may provide a source of fluid under pressure operable in a servo system to control the position of the piston 46 within its cylinder 48 and thus the longitudinal position of the shaft 26 along its rotational axis.

As generally alluded to previously, the relative angular positions between two permanent magnet assemblies such as those illustrated at 28 and 30 herein may be controlled according to any of a variety of different variables. Such control parameters form no part of the present invention, it being sufficient to note that conventional control as desired may be utilized to determine the position 46 of the piston within the cylinder 48, and thus control the position of the shaft 26 along its longitudinal axis. Because the shaft 26 is splined to the permanent magnet assemblies 28 and 30 and the splines are pitched equally and oppositely of one another, and further, the presence of the bearings prevents axial movement of the permanent magnet assemblies 28 and 30 in response to axial movement of the shaft 26, it will be appreciated that axial movement of the shaft 26 will cause both of the permanent magnet assemblies 28 and 30 to rotate on the shaft 26. In other words, neither assembly 28 or 30 is affixed to the shaft 26, and both will rotate relative thereto in response to a change in the shaft position along its rotational axis. Moreover, the movement will be in opposite directions, due to the opposite pitch of the spline connections. Furthermore, the movement will be equal in the angular sense because the pitches of the helical splines, though opposite, are equal.

Consequently, operational forces tending to resist movement of, for example, the permanent magnet assembly 28 in one angular direction about the axis defined by the shaft 26 will act to aid the angular movement of the permanent magnet assembly 30, since it is moving in the opposite direction. Thus, since both are connected together through a common splined mechanism and the shaft 26, such loading forces will offset one another, allowing adjustment of the assemblies 28 and 30 to be made essentially independently of operational loading on the generator. As a consequence, adjustment of the relative positions between the assemblies 28 and 30 can be easily and accurately effected to provide precise variation in whatever parameter of the generator is to be controlled.

We claim:

1. A permanent magnet generator comprising:
an elongated shaft having opposed ends;
first and second helical splines on said shaft adjacent respective ends thereof, said splines having opposite pitches;
first and second permanent magnet assemblies located about said shaft and rotatable with respect thereto;
a thrust and journal bearing for said permanent magnet assmblies;
said first magnet assembly being to one side of said bearing and connected to said first spline;
said second magnet assembly being on the other side of said bearing and connected to said second spline;
a stator including an armature means coaxial with said shaft and having an axial extent encompassing said magnet assemblies, said armature means mounting said bearing intermediate the ends of said armature means; and
means for axially moving said shaft relative to said bearing and said magnet assemblies to cause said magnet assemblies to simultaneously rotate in opposite directions on said shaft.

2. The permanent magnet generator of claim 1 wherein said moving means comprises a control piston.

3. The permanent magnet generator of claim 1 wherein one end of said shaft includes an axial spline, a drive shaft axially aligned with said shaft one end, and a spline collar interconnecting said drive shaft and said axial spline.

4. The permanent magnet generator of claim 3 wherein said moving means comprises a motor connected to said elongated shaft at the end thereof opposite said one end.

* * * * *